UNITED STATES PATENT OFFICE.

FREDERICK W. SCHROEDER, OF NEW YORK, N. Y., ASSIGNOR OF ONE-HALF TO FERDINAND W. ROEBLING, OF TRENTON, NEW JERSEY.

INSULATING COMPOSITION OR COMPOUND FOR COATING ELECTRIC AND OTHER WIRES OR CONDUCTORS.

SPECIFICATION forming part of Letters Patent No. 251,473, dated December 27, 1881.

Application filed October 21, 1881. (No specimens.)

*To all whom it may concern:*

Be it known that I, FREDERICK W. SCHROEDER, of the city of New York, in the county and State of New York, have invented a new and useful Insulating Composition or Compound for Coating Electric and other Wires or Conductors, which invention is fully set forth in the following specification.

The object of this invention is to provide the conducting wires, rods, or cables for telegraphs, telephones, electric lights, and all similar purposes with a coating that shall be fire-proof, weather-proof, water-proof, and invulnerable to acids, as well as an efficient insulator or non-conductor of electricity.

Following are enumerated certain ingredients used in the manufacture of this composition, their manipulation and method of treatment being also fully set forth, namely: glue, gum-mastic, dextrine, asbestus, chrome-alum, chloride of iron, albumen, and glycerine. Said ingredients, in about the several proportions below mentioned, are treated as follows: Two pounds of glue, preferably of the best quality, are first dissolved in one pound and a half of warm water in a suitable vessel set in a water bath heated not above the boiling-point. Then sixteen ounces of gum-mastic are dissolved in thirty-two ounces of alcohol, and fourteen ounces of dextrine in twenty-four ounces of alcohol, each of said gums, after thorough dissolution in the alcohol, being poured into and well mixed and stirred with the glue. To the above mixture are then added nine ounces of asbestus, well ground, in sixteen ounces of glycerine, and two and one-half ounces of chrome-alum dissolved in eight ounces of glycerine. To the mixture constituted as above described is next added one-fourth of an ounce of chloride of iron dissolved in fourteen ounces of water. From eight to twenty ounces of albumen incorporated with from two to eight ounces of glycerine should then be added to the mixture, if the composition is intended to be exposed to the atmosphere or to salt-water. If not, the albumen may be omitted, and, if desired, the asbestus also may be omitted where no danger of fire exists. Such a composition is set forth in the specification in another application herewith filed. The whole mixture is then carefully stirred until all the ingredients are thoroughly incorporated, care being taken that the mixture shall not boil or reach its normal temperature of ebullition at atmospheric pressure. The alcohol and water are used merely as menstrua or vehicles for the solids dissolved therein and being evaporated or driven off in the process or treatment. Any suitable solvents may be substituted therefor. The composition may be kept for an indefinite time in a melted or plastic state, but must not be allowed to set by cooling.

While in its warm plastic condition the composition is applied to the wire or other article to be coated, machinery of suitable character being used for this purpose, by which the coating as applied is subjected to great pressure.

The composition, made and applied as above described, forms a thoroughly-insulating coat, impervious to the atmosphere and to either salt or fresh water. It is invulnerable to the attacks of acids, and of so refractory a nature that wire coated with it may be fused within its coat and the coat will remain as a hollow tube, uninjured by the heat of the fused metal. This coating will therefore prevent the cost of renewal and the greater annoyance of delayed use caused by the destruction by fire of telegraph and telephone wires not thus protected within buildings, within which fires, doing but little injury to the buildings, frequently destroy or sever all the conducting-wires. Conductors coated with this composition may also be laid in the earth with no other protection, the composition being indestructible either above or below ground, except by cutting or abrading forces.

Lightning-conductors used to protect highly-combustible materials—such as petroleum, usually stored in large quantities—may be thoroughly insulated by a coating of this composition, the gases arising from the oil having no destructive effect upon the coating, and its perfect insulating qualities preventing ignition of said gases from the electrified condition of the lightning-conductors.

In place of the asbestus, silicate of soda or "water-glass" may be substituted, and in place of the mastic either gum-arabic or the gum of the cherry-tree may be substituted; and any suitable pigments or coloring-matter may be added, if desired, to the ingredients above mentioned.

I do not confine myself to the precise quantities or proportions of the materials herein noted, as the proportions may be varied. The quantities noted are, however, those which experience has determined to be attended with the most satisfactory results.

As of my invention, I claim—

A refractory insulating composition for coating or covering electric and other wires or conductors, consisting of glue, mastic, dextrine, asbestus, chrome-alum, chloride of iron, and glycerine, said ingredients being proportioned and treated either with or without the addition of albumen substantially as and for the purposes set forth.

FREDERICK WILLIAM SCHROEDER.

Witnesses:
D. H. KENAGA,
G. A. CLEMENT.